US 12,352,178 B2

(12) United States Patent
Parsley et al.

(10) Patent No.: US 12,352,178 B2
(45) Date of Patent: Jul. 8, 2025

(54) TURBINE OVERSPEED PROTECTION

(71) Applicant: ROLLS-ROYCE plc, London (GB)

(72) Inventors: Andrew Parsley, Bristol (GB); Natalie C Wong, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/625,769

(22) Filed: Apr. 3, 2024

(65) Prior Publication Data

US 2024/0368999 A1     Nov. 7, 2024

(30) Foreign Application Priority Data

May 3, 2023   (GB) ...................................... 2306521

(51) Int. Cl.
*F01D 21/14*     (2006.01)
*F01D 17/02*     (2006.01)
(Continued)

(52) U.S. Cl.
CPC ............. *F01D 21/14* (2013.01); *F01D 17/02* (2013.01); *F01D 17/04* (2013.01); *F01D 17/06* (2013.01); *F01D 17/105* (2013.01); *F01D 21/003* (2013.01); *F01D 21/02* (2013.01); *F01D 21/04* (2013.01); *F01D 21/06* (2013.01); *F02C 3/13* (2013.01); *F02C 6/08* (2013.01); *F02C 6/18* (2013.01); *F02C 9/18* (2013.01);
(Continued)

(58) Field of Classification Search
CPC ........ F01D 21/02; F01D 21/003; F01D 21/04; F01D 21/045; F01D 21/14; F01D 17/02; F01D 17/04; F01D 17/06; F01D 17/105; F01D 17/26; F04D 27/00; F04D 27/009; F04D 27/0207; F04D 27/0238; F02C 3/13; F02C 9/18; F02C 9/24; F02C 6/08; F02C 6/18
See application file for complete search history.

(56) References Cited

U.S. PATENT DOCUMENTS 4,539,809 A      9/1985  Stanley et al.
10,626,925 B2    4/2020  Boniface
(Continued)

FOREIGN PATENT DOCUMENTS

GB    2 574 495 A    12/2019
GB    2 574 693 A    12/2019

OTHER PUBLICATIONS

Aug. 20, 2024 Office Action issued in U.S. Appl. No. 18/625,842.
(Continued)

*Primary Examiner* — Kyle Robert Thomas
(74) *Attorney, Agent, or Firm* — Oliff PLC

(57) ABSTRACT

An apparatus and method for reducing a pressure differential across a turbine 19 of a gas turbine engine 10 during a shaft break event, comprises a pressure equalization apparatus 200 configured to introduce a pressurised fluid into a core airflow A at a region downstream of the turbine 19 in the event of a shaft break to directly increase a local pressure at the downstream region 29 of the turbine 19 and thereby reduce the pressure differential across the turbine 19. The pressure equalization apparatus comprises a sensor 216 configured to directly detect a shaft break event. The reduction in the pressure differential may result in a reduction in the acceleration of the turbine 19.

15 Claims, 6 Drawing Sheets

(51) Int. Cl.

| | | |
|---|---|---|
| *F01D 17/04* | (2006.01) | |
| *F01D 17/06* | (2006.01) | |
| *F01D 17/10* | (2006.01) | |
| *F01D 21/00* | (2006.01) | |
| *F01D 21/02* | (2006.01) | |
| *F01D 21/04* | (2006.01) | |
| *F01D 21/06* | (2006.01) | |
| *F02C 3/13* | (2006.01) | |
| *F02C 6/08* | (2006.01) | |
| *F02C 6/18* | (2006.01) | |
| *F02C 9/18* | (2006.01) | |
| *F02C 9/24* | (2006.01) | |
| *F04D 27/00* | (2006.01) | |
| *F04D 27/02* | (2006.01) | |

(52) U.S. Cl.
CPC .............. *F02C 9/24* (2013.01); *F04D 27/009* (2013.01); *F04D 27/0207* (2013.01); *F04D 27/0238* (2013.01); *F05D 2270/09* (2013.01); *F05D 2270/3015* (2013.01)

(56) References Cited

U.S. PATENT DOCUMENTS

| | | |
|---|---|---|
| 11,053,861 B2 | 7/2021 | Moster et al. |
| 11,236,681 B2 * | 2/2022 | Beauchesne-Martel .................... F02C 9/28 |
| 11,629,613 B2 * | 4/2023 | Wong ........................ F02K 1/11 60/773 |
| 2006/0042226 A1 | 3/2006 | Trumper et al. |
| 2017/0254295 A1 | 9/2017 | Moster et al. |
| 2020/0200037 A1 | 6/2020 | Brown et al. |
| 2020/0248581 A1 | 8/2020 | Jones et al. |
| 2020/0248582 A1 * | 8/2020 | Wong ........................ F02C 9/20 |
| 2021/0095602 A1 | 4/2021 | Calderon et al. |
| 2023/0010174 A1 | 1/2023 | McCarthy et al. |

OTHER PUBLICATIONS

Oct. 10, 2023 Search Report issued in British Patent Application No. 2306518.8.
Oct. 16, 2023 Search Report issued in British Patent Application No. 2306521.2.
Oct. 10, 2023 Search Report issued in British Patent Application No. 2306519.6.
U.S. Appl. No. 18/625,743, filed Apr. 3, 2024 in the name of Parsley, A. et al.
U.S. Appl. No. 18/625,842, filed Apr. 3, 2024 in the name of Parsley, A. et al.
13, 2025 Notice of Allowance issued in U.S. Appl. No. 18/625,842.
Nov. 18, 2024 Extended European Search Report issued in European Patent Application No. 24165901.0.
Feb. 28, 2025 Office Action issued in U.S. Appl. No. 18/625,743.

* cited by examiner

Figure 4 (previously known)

TURBINE OVERSPEED PROTECTION

This disclosure claims the benefit of UK Patent Application No. GB 2306521.2, filed on 3 May 2023, which is hereby incorporated herein in its entirety.

The present disclosure relates turbine overspeed protection in a gas turbine engine.

Modern gas turbine engines generally have up to three compressor-turbine pairs, also referred to as spools, connected by respective coaxial shafts. These compressor-turbine groups are responsible for the compression and expansion of core gas passing through the engine.

It is possible that during operation of the gas turbine engine, a shaft connecting a compressor-turbine pair may fail mechanically. This breakage leads to an instantaneous decoupling of the turbine and its respective compressor. In this situation, as the compressor is no longer being driven by the turbine, the load on the turbine is significantly reduced. It is therefore possible that the turbine may accelerate rapidly under the reduced load. The rapid acceleration has the potential to cause the turbine to disintegrate or burst leading to further damage to the engine as a result of the overspeed condition.

Some methods for protecting against turbine overspeed resulting from a shaft break event are known. For instance, GB2574495 describes a method which involves detecting a shaft break event and activating a mitigation system which introduces a fluid into a gas flow of the gas turbine engine downstream of the turbine or increases an amount of a fluid being provided into the gas flow of the gas turbine engine downstream of the turbine. This reduces an effective area of a nozzle for the gas flow to increase back pressure and therefore reduce the mass flow rate of the gas flow through the turbine.

Any such apparatus or methods for turbine overspeed protection must act extremely quickly after a shaft break event has occurred, or else risk not limiting the turbine speed in time.

The present disclosure provides a rapid and reliable apparatus and method for shaft break detection and subsequent turbine overspeed protection.

SUMMARY

According to a first aspect of the present disclosure, there is provided an apparatus for reducing a pressure differential across a turbine of a gas turbine engine during a shaft break event in which a shaft of the gas turbine engine breaks. The apparatus may comprise a pressure equalization apparatus configured to introduce a pressurised fluid into a core airflow at a region downstream of the turbine in the event of a shaft break to directly increase a local pressure at the downstream region of the turbine and thereby reduce the pressure differential across the turbine; a sensor configured to directly detect a shaft break event; and a control system connected to the sensor, wherein the control system is configured to activate the pressure equalization apparatus when the sensor directly detects a shaft break event.

Core airflow should be understood to mean the path of gas primarily travelling through the compressor, combustor, and turbine of the gas turbine engine. Directly detecting a shaft break should be understood to mean an axial movement, optionally a rearward axial movement of at least a portion of the turbine and/or shaft during a shaft break event causes the shaft break event to be detected, rather than the detection occurring through inference or by any other indirect method.

One example of an indirect detection method is comparing the rotational speeds of a compressor portion of a shaft and a turbine portion of the same shaft. If a difference in rotational speed is found, it is inferred that this means the shaft has broken. In contrast, the present disclosure directly detects an axial movement of at least a portion of the turbine and/or shaft.

As a minimum of one measurement is required to directly detect a shaft break compared to a minimum of two at two different points for indirect detection, the present disclosure may use fewer sensors compared to indirect detection methods. This may reduce design, manufacturing, and/or maintenance complexity.

Directly increasing local pressure should be understood to mean that the pressurised fluid increases local pressure by virtue of its addition, and that no intermediate or additional action, such as combustion of the introduced fluid, is required to provide the local pressure increase.

The apparatus may comprise a pressurised fluid supply in communication with the core airflow at the downstream region and a regulating element configured to regulate the introduction of pressurised fluid from the supply into the core airflow at the downstream region. The regulating element may be configured to inhibit the flow of pressurised fluid from the supply into the core airflow at the downstream region before a shaft break event occurs and may be configured to permit the flow of pressurised fluid from the supply into the core airflow at the downstream region once a shaft break event occurs.

The pressurised fluid may be supplied from any suitable source including, but not limited to, a compressor bleed, a combustor bleed, a bypass airflow, or a pressurised fluid storage tank etc. The pressurised fluid may be air or any other appropriate liquid or gas capable of providing an increase in pressure downstream of the turbine by virtue of its introduction.

The sensor may be configured to directly detect a shaft break event. The sensor may be connected to the control system and may be configured transmit a signal to the control system once it directly detects a shaft break event. The control system may be configured to, on receiving the signal, activate a regulating element to permit the flow of pressurised fluid into the core airflow at the downstream region. The regulating element may comprise a valve or pump.

According to a second aspect of the present disclosure, there is provided a gas turbine engine comprising an apparatus as described above. The pressure equalization apparatus of the present disclosure is applicable to both reheated and non-reheated gas turbine engines.

According to a third aspect of the present disclosure, there is provided a method for reducing a pressure differential across a turbine of a gas turbine engine during a shaft break event in which a shaft of the gas turbine engine breaks. The method may comprise providing a pressure equalization apparatus configured to introduce a pressurised fluid into a core airflow at a region downstream of the turbine in the event of a shaft break to directly increase a local pressure at the downstream region of the turbine and thereby reduce the pressure differential across the turbine; providing a sensor configured to directly detect a shaft break event; providing a control system connected to the sensor, wherein the control system is configured to activate the pressure equalization apparatus when the sensor directly detects a shaft break event.

The method may comprise providing a pressurised fluid supply in communication with the core airflow at the downstream region and providing a regulating element configured to regulate the introduction of pressurised fluid from the supply into the core airflow at the downstream region. The regulating element may be a valve or pump.

The method may then go on to inhibit, using the regulating element, the flow of pressurised fluid from the supply into the core airflow at the downstream region before a shaft break event occurs; and permit, using the regulating element, the flow of pressurised fluid from the supply into the core airflow at the downstream region once a shaft break event occurs.

The method may further comprise transmitting a signal from the sensor to the control system when the sensor directly detects a shaft break. The method may then go on to activate the regulating element via the control system when the control system receives the signal transmitted by the sensor. The activation of the regulating element may cause the flow of pressurised fluid into the core airflow at the downstream region to be permitted. The regulating element may be a valve or pump. According to a fourth aspect, there is provided a gas turbine engine configured to carry out a method as described above.

The sensor of apparatus and methods above may directly detect a shaft break event by detecting an axial, optionally a rearward axial, movement of at least a portion of the turbine and/or the shaft resulting from a shaft break event. The direct detection of this movement may be achieved using, for example, a retroreflective photoelectric sensor, an ultrasonic sensor, a time-of-flight distance sensor, or a Hall effect sensor. This list of possible sensors should not be considered exhaustive.

References to an axial movement mean a movement is a direction substantially parallel with the longitudinal axis of the gas turbine engine. References to a rearward axial movement mean a movement in a direction from inlet of the engine to the exhaust of the engine substantially parallel to the longitudinal axis.

The control system of the apparatus and methods described above may take any form and may comprise a processor for interpreting signals sent by the sensor and executing instructions to activate the regulating element. The instructions may be stored in a memory. The control system may also interface with or be a constituent part of another system such as an engine control system, fuel control unit etc. In some examples, the control system may be a mechanical, analogue, or non-digital control device.

The apparatus and methods disclosed may improve safety and reduce the likelihood of extensive damage during a shaft break event in a gas turbine engine. In vehicles comprising a gas turbine engine which are capable of high forward velocity, such as aircraft, the disclosed apparatus and methods may be particularly effective to reduce the likelihood of a turbine disc burst in a shaft break event.

The apparatus and methods disclosed may also reduce a time delay between when a shaft break event occurs and when a reduction in turbine rotational acceleration is achieved.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e., the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e., the portion radially outside any platform. The radius of the fan may be measured between the engine centreline and the tip of a fan blade at its leading edge. The fan diameter (which may simply be twice the radius of the fan) may be greater than (or on the order of) any of: 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e., the values may form upper or lower bounds), for example in the range of from 210 cm to 240 cm, or 250 cm to 280 cm, or 320 cm to 380 cm.

The rotational speed of the fan may vary in use. Generally, the rotational speed is lower for fans with a higher diameter. Purely by way of non-limitative example, the rotational speed of the fan at cruise conditions may be less than 2600 rpm, for example less than 2500 rpm, or less than 2300 rpm. Purely by way of further non-limitative example, the rotational speed of the fan at cruise conditions for an engine having a fan diameter in the range of from 210 cm to 300 cm (for example 240 cm to 280 cm or 250 cm to 270 cm) may be in the range of from 1700 rpm to 2600 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e., the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e., the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest-pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e., the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 130 kN, 135 kN, 140 kN, 145 kN, 150 kN, 155 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e., the values may form upper or lower bounds). Purely by way of example, a gas turbine as described and/or claimed herein may be capable of producing a maximum thrust in the range of from 155 kN to 170 kN, 330 kN to 420 kN, or 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high-pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1520K, 1530K, 1540K, 1550K, 1600K or 1650K. The TET at cruise may be in an inclusive range bounded by any two of the values in the previous sentence (i.e., the values may form upper or lower bounds), for example 1530K to 1600K. The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e., the values may form upper or lower bounds), for example in the range of from 1800K to 1950K, or 1900K to 2000K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent). Cruise conditions thus define an operating point of the gas turbine engine that provides a thrust that would ensure steady state operation (i.e., maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Arrangements will now be described by way of example only, with reference to the Figures, in which.

DETAILED DESCRIPTION

Figure 1:
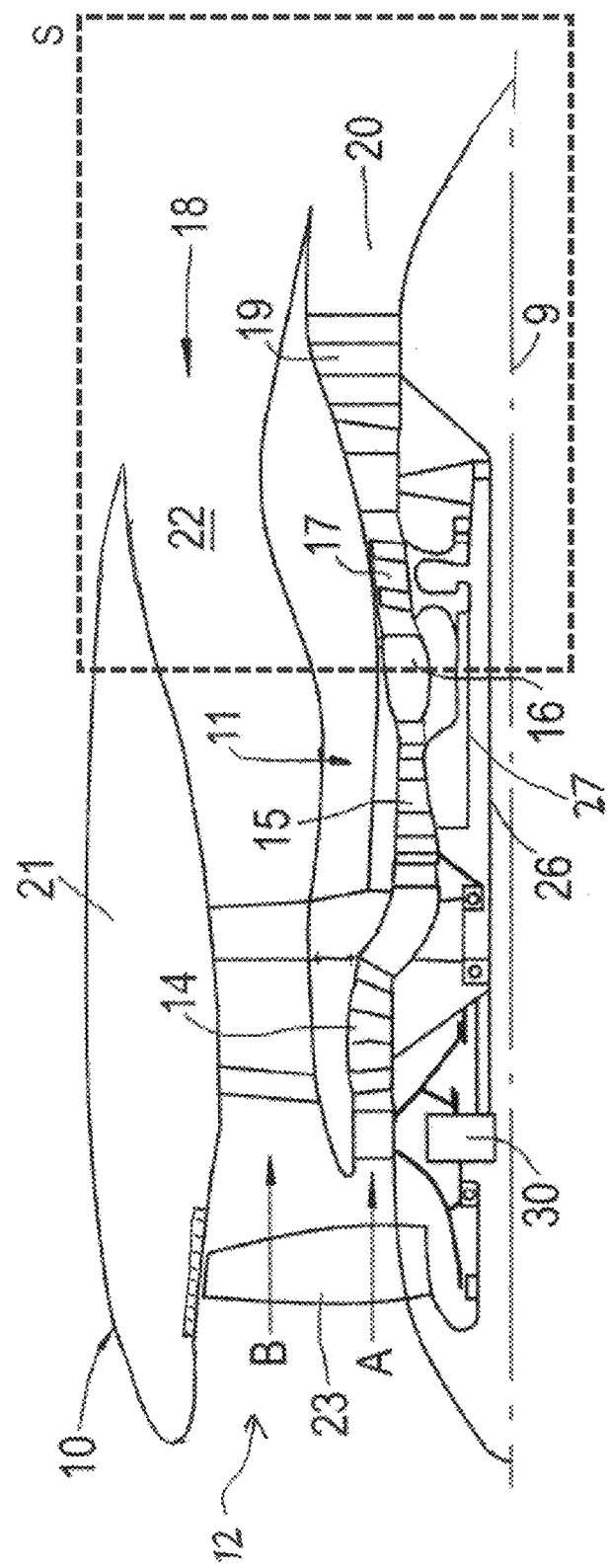
FIG. 1 is a sectional side view of a gas turbine engine.

FIG. 1 illustrates a gas turbine engine 10 having a principal rotational axis 9 (also referred to as the axis 9). The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

A section labelled S is also shown on FIG. 1. This section shows the area where a turbine 19 overspeed protection apparatus of the present disclosure would be disposed.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust. The epicyclic gearbox 30 is a reduction gearbox.

Figure 2:
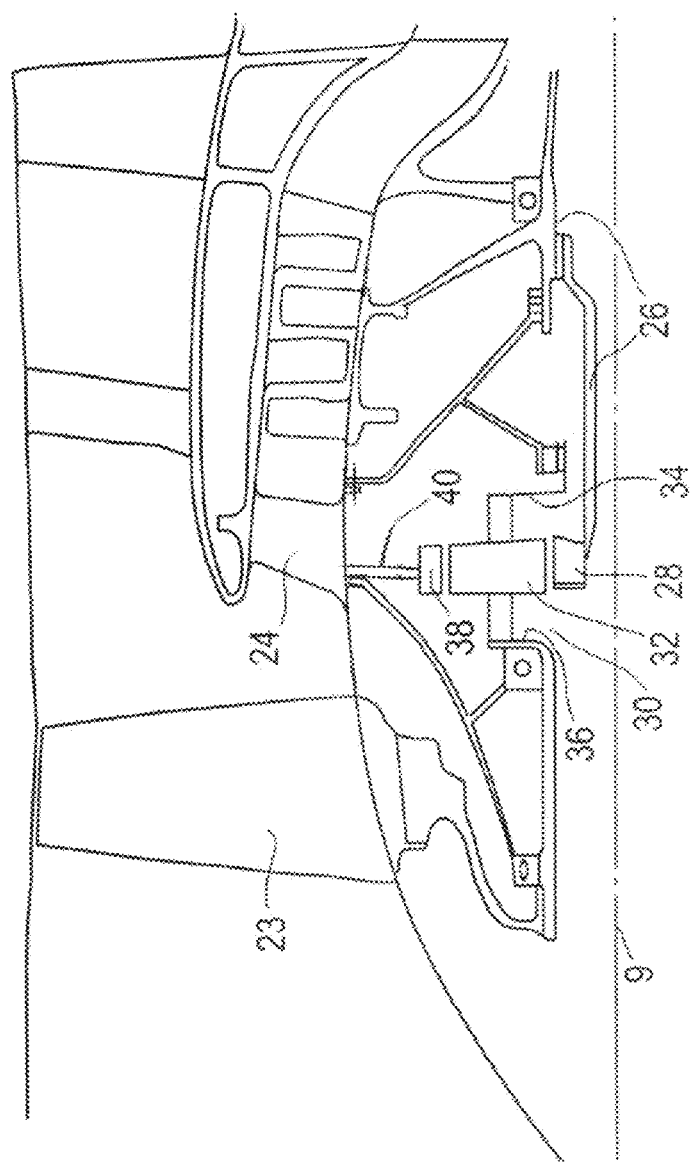
FIG. 2 is a close-up sectional side view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
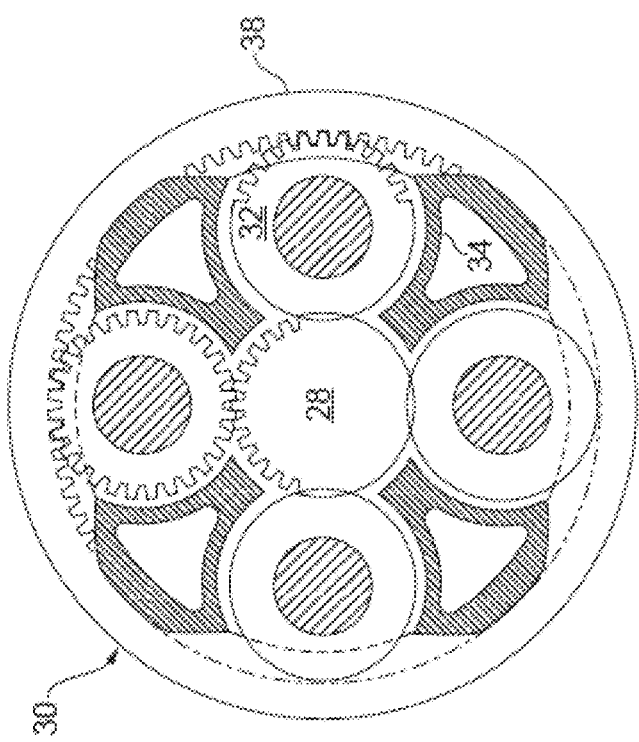
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the present disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

During a shaft break event, a shaft connecting a turbine to a compressor in a gas turbine engine 10 undergoes a sudden failure. This results in the turbine no longer being constrained in its rotation or in the longitudinal axis 9. Further, as the load provided by the compressor is no longer acting on the turbine, it is possible for the fluid continuing to pass through the turbine to cause the turbine to accelerate in rotational speed. Turbines are generally rated to a maximum operating rotational speed based, at least partly, on material and geometry. Beyond this speed the turbine may become unsafe. When a shaft break event occurs, there is a possibility of an overspeed condition where the free spinning turbine exceeds this maximum rated speed possibly causing the turbine to disintegrate or burst.

Figure 4:
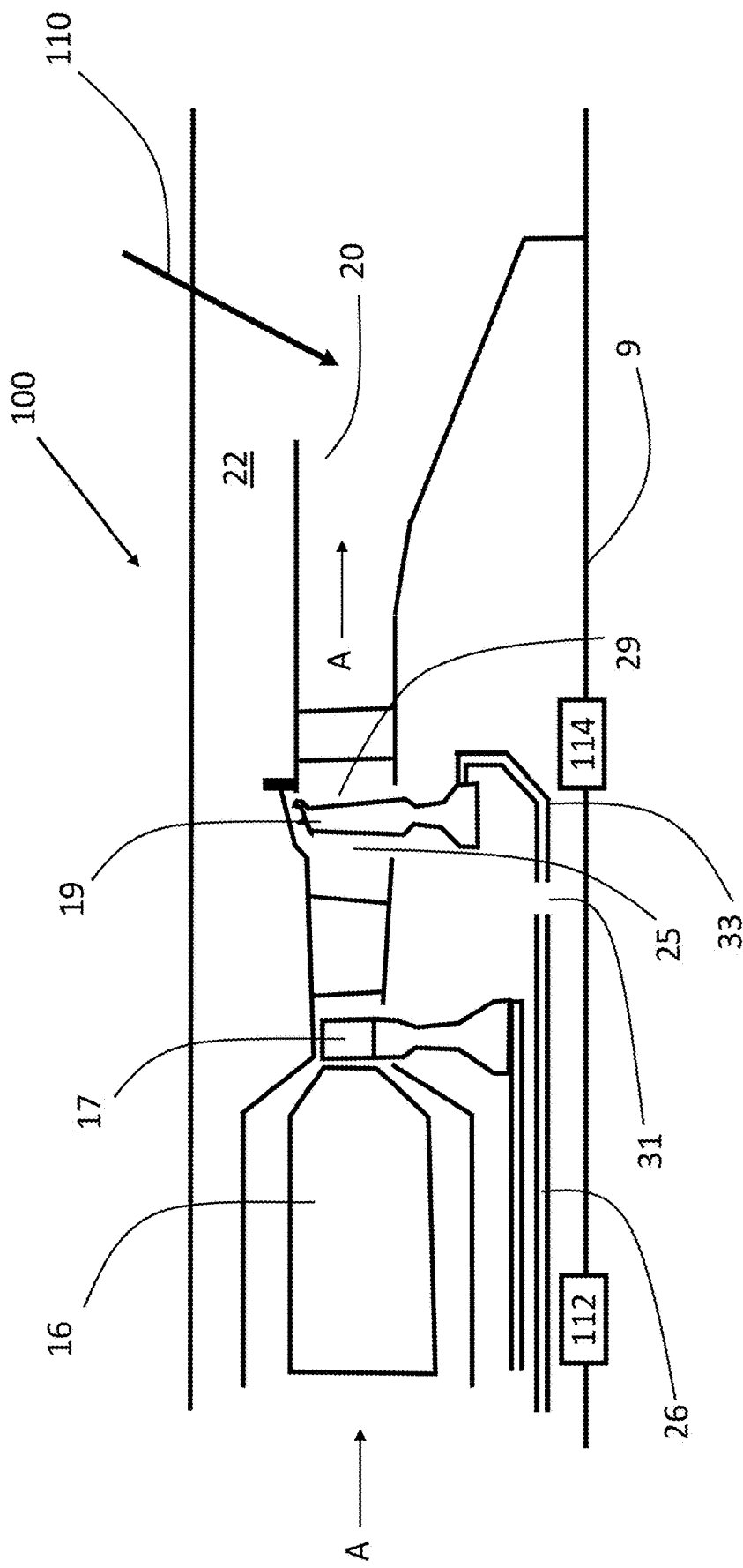
FIG. 4 shows an apparatus for providing turbine overspeed protection known previously.
Figure 5:
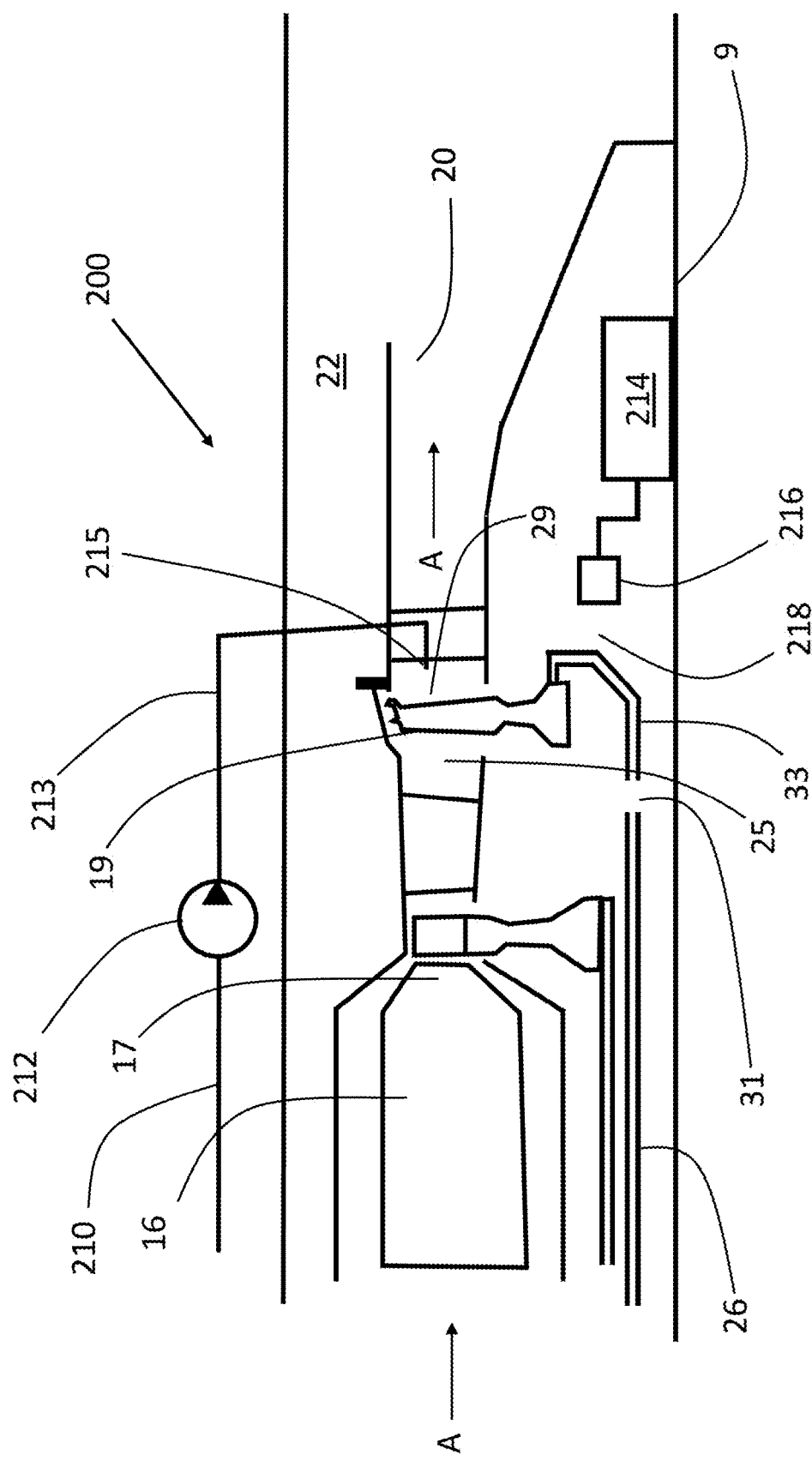
FIG. 5 shows one exemplary arrangement which uses a pump to introduce pressurised fluid.

FIGS. 4 and 5 of the present disclosure are sectional views of a gas turbine engine 10. The approximate section shown in each is highlighted in FIG. 1 as box S. In these FIGS. 4 and 5, a shaft break event is shown as a separation of the shaft 26 from the shaft end 33 at break point 31.

FIG. 4 shows an apparatus 100 for turbine overspeed protection already known. An amount of fluid 110 is added (or the amount of fluid 110 already being added is increased) downstream of the low-pressure turbine 19 (also referred to as the turbine 19) in a region proximate the exhaust nozzle 20 when a shaft break event is indirectly detected. The indirect detection occurs by comparing a difference between the speed measured by a first sensor 112 and a second sensor 114. A shaft break is considered detected when there is a difference in these two speed measurements. As a result of the fluid 110 introduction, the effective cross-sectional area of the exhaust nozzle 20 decreases, causing a backpressure to travel upstream from the exhaust nozzle 20. Therefore, the mass flow rate through the turbine 19 is also reduced. Correspondingly, the energy imparted to the turbine 19 by the core airflow A reduces, causing a reduction in the terminal speed of the turbine 19.

FIG. 5 shows an exemplary apparatus for reducing a pressure differential across a turbine (19) of a gas turbine engine (10) during a shaft break event in which a shaft (26) of the gas turbine engine (10) breaks.

In contrast to the apparatus 100 of FIG. 4, the following arrangement of the present disclosure shown in FIG. 5 employs a different principal by reducing a pressure differential between a region directly upstream of the turbine 19 and a region downstream of the turbine 19 in the event of a shaft break. This is achieved by introducing a pressurised fluid downstream of the turbine 19 in the downstream region 29, causing the pressure of the downstream region 29 to increase relative to the upstream region 25. As a result of this increase, less energy is imparted to the turbine 19, so its acceleration stops or reduces—avoiding an overspeed condition. The pressurised fluid increases the pressure local to the downstream region 29 by virtue of its addition, and no immediate or additional action such as combustion of the introduced fluid is required to provide the pressure increase. Furthermore, as the pressurised fluid is introduced at the downstream region 29, there may be a near-instantaneous pressure increase at the downstream region 29 and therefore a near-instantaneous slowing of the turbine 19. Whereas, in arrangement of FIG. 4, a notable delay may occur while a backpressure wave travels the significant distance upstream from the exhaust nozzle 20 to cause a pressure increase in the downstream region 29.

FIG. 5 shows one possible arrangement of the apparatus 200. In this arrangement, a sensor 216 is configured to directly detect when a shaft break event occurs. Direct detection of a shaft break event is achieved, in one arrangement, by detecting an axial, and optionally rearward, movement of at least a portion of the turbine 19 and/or the shaft 26 or shaft end 33 resulting from a shaft break event. In some embodiments, a photoelectric sensor is used to monitor a distance 218 between a position downstream of the turbine 19 and the turbine 19 and/or shaft end 33. When there is a change is this distance, a shaft break event has occurred.

The sensor 216 is connected to a control system 214 and is configured to transmit a signal to the control system 214 when it directly detects a shaft break event (for instance, when the distance 218 changes). In some examples, the control system 214 forms part of a larger system, like an engine control unit or fuel control unit.

A pressurised fluid supply 210 is provided, which is capable of directing pressurised fluid into the core airflow A at the downstream region 29. A pump 212 acts as a regulating element and is disposed in-line with the pressurised fluid supply 210. Before a shaft break event is directly detected by the sensor 216, the pump 212 inhibits the flow of pressurised fluid from the supply 210 to the downstream region 29. Once the sensor 216 directly detects a shaft break event and the control system 214 receives the signal transmitted by the sensor 216, the control system 214 activates the pump 212. On activation, the pump 212 begins to permit the flow of pressurised fluid from the supply 210 into the core airflow A at the downstream region 29. In particular, a fluid line 213 is provided from the pump 212, the line 213 having an outlet 215 at the downstream region 29, so as to introduce the pressurised fluid into the downstream region 29.

As the pressurised fluid begins to flow into the downstream region 29, the pressure in the downstream region 29 increases. This leads to a decrease in the pressure differential across the turbine 19, resulting in the acceleration of the turbine 19 reducing.

The sensor 216 and control system 214 of this particular arrangement 200 are electrical in nature, but other arrangements using mechanical or analogue control systems are applicable. For instance, in some arrangements, the control system 214 is a mechanical linkage whereby the pump 212 is actuated by a physical movement of the control system 214 initiated by the sensor 216 directly detecting a shaft break event.

In some examples, a valve is used instead of the pump 212 to function as the regulating element. Many different types of valve are applicable.

Figure 6:
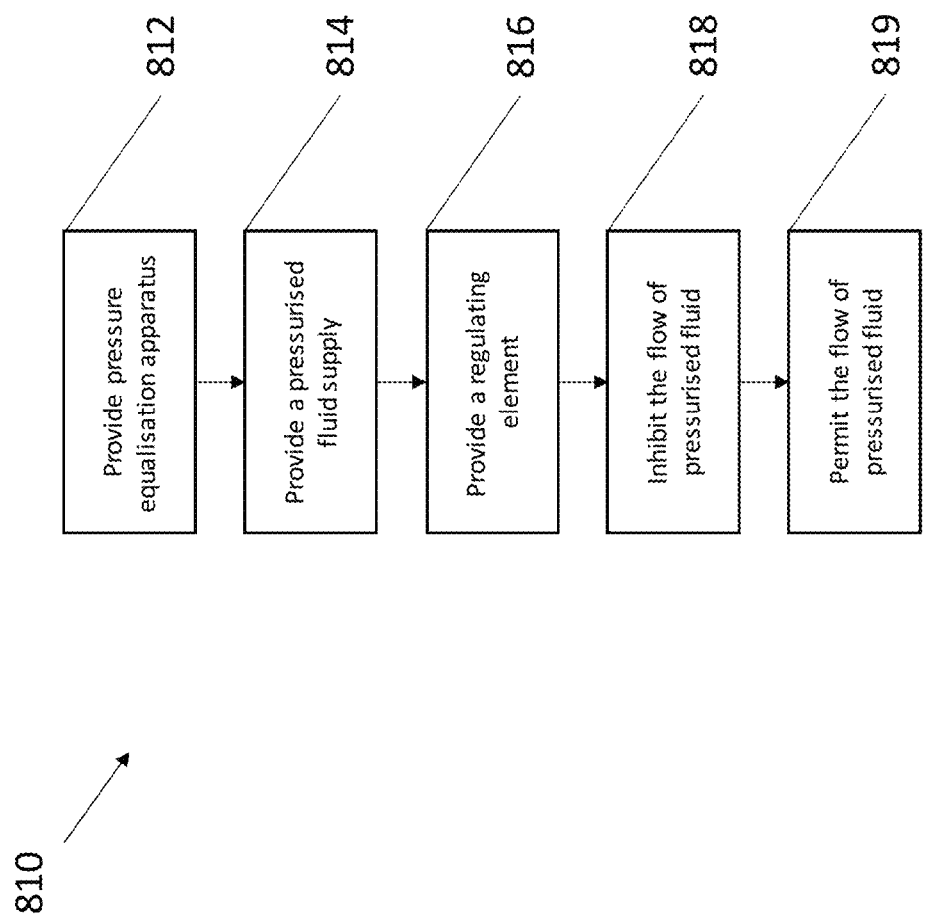
FIG. 6 shows one exemplary arrangement of the method which uses a regulating element to control the flow of pressurised fluid.

With reference to FIG. 6, a method 810 which uses a regulating element to control the flow of pressurised fluid is shown. The method 810 first involves step 812 providing a pressure equalisation apparatus. The pressure equalisation apparatus is capable of introducing a pressurised fluid into the downstream region 29 in the event of a shaft break in order to directly increase the pressure in the downstream region 29. The pressure equalisation apparatus comprises a sensor 216 capable of directly detecting a shaft break. In this method, the sensor 216 may directly detect a shaft break by detecting an axial, and optionally rearward, movement of at least a portion of the turbine 19 and/or the shaft 26 or shaft end 33 resulting from a shaft break event. In some variants of the method, a photoelectric sensor is used to monitor a distance 218 between a position downstream of the turbine 19 and the turbine 19 and/or shaft end 33. When there is a change is this distance, a shaft break event has occurred.

A pressurised fluid supply is then provided in step 814. This pressurised fluid supply is in communication with the core airflow A at the downstream region 29. In step 816 a regulating element is provided. The regulating element is capable of controlling the introduction of pressurised fluid from the pressurised fluid supply into the downstream region 29.

Step 818 represents the standard state of the system before a shaft break event occurs. In this state, the regulating element inhibits the flow of pressurised fluid from the supply into the downstream region 29. Once a shaft break event occurs, the method continues on to step 819 where the regulating element beings to permit the flow of pressurised fluid into the core airflow A at the downstream region 29.

The regulating element is controlled by a control system 214. When the sensor 216 directly detects a shaft break, it sends a signal to the control system 214. On receiving the signal, the control system 214 then activates the regulating element, causing pressurised fluid to begin to flow from the supply 210 into the downstream region 29. In some examples, the regulating element is a pump 212 which is actuated by the control system 214. In other examples, the regulating element is a valve which is actuated by the control system 214.

Although the arrangements disclosed relate to the low-pressure turbine 19, other arrangements related to other turbines (e.g., the high-pressure turbine 17) using the same apparatus or methods as defined by the appended claims are also applicable. Any other arrangements for reducing a pressure differential across a turbine by introducing a pressurised fluid into a core airflow downstream of the turbine when a sensor directly detects a shaft break are also covered by the present disclosure.

It will be understood that the disclosure is not limited to the arrangements above described and various modifications and improvements can be made without departing from the scope of the claims. Except where mutually exclusive, any of the features may be employed separately or in combination with any other features and the disclosure extends to and includes all combinations and sub-combinations of one or more features described herein.

What is claimed is:

1. An apparatus for reducing a pressure differential across a turbine of a gas turbine engine during a shaft break event in which a shaft of the gas turbine engine breaks, the apparatus comprising:
    a pressure equalization apparatus configured to introduce a pressurized fluid into a core airflow at a region (i) downstream of the turbine and (ii) forward of an exhaust nozzle in the event of the shaft break event to, without combustion of the pressurized fluid, directly and near-instantaneously increase a local pressure at the downstream region of the turbine and thereby reduce the pressure differential across the turbine;
    a sensor configured to directly detect the shaft break event; and
    a control system connected to the sensor,
    wherein the control system is configured to activate the pressure equalization apparatus when the sensor directly detects the shaft break event.

2. The apparatus as claimed in claim 1, further comprising:
    pressurized fluid supply in communication with the core airflow at the downstream region; and a regulating element configured to regulate introduction of the pressurized fluid from the supply into the core airflow at the downstream region, wherein the regulating element is configured to inhibit flow of the pressurized fluid from the supply into the core airflow at the downstream region before the shaft break event occurs and is configured to permit the flow of the pressurized fluid from the supply into the core airflow at the downstream region once the shaft break event occurs.

3. The apparatus as claimed in claim 2, wherein the sensor is configured to transmit a signal to the control system when the sensor directly detects the shaft break event, the control system being configured to, on receiving the signal, activate the regulating element to permit the flow of the pressurized fluid into the core airflow at the downstream region.

4. The apparatus as claimed in claim 2, wherein the regulating element comprises a valve or pump.

5. The apparatus as claimed in claim 2, wherein the pressurized fluid of the pressurized fluid supply is supplied from a compressor bleed, a combustor bleed, a bypass airflow, or a pressurized fluid storage tank.

6. The apparatus as claimed in claim 2, wherein the pressurized fluid is a liquid.

7. The apparatus as claimed in claim 1, wherein the sensor directly detects the shaft break event by measuring axial movement of at least a portion of the shaft or the turbine resulting from the shaft break event.

8. A gas turbine engine comprising the apparatus as claimed in claim 1.

9. A method for reducing a pressure differential across a turbine of a gas turbine engine during a shaft break event in which a shaft of the gas turbine engine breaks, the method comprising:

providing a pressure equalization apparatus configured to introduce a pressurized fluid into a core airflow at a region (i) downstream of the turbine and (ii) forward of an exhaust nozzle in the event of the shaft break event to, without combustion of the pressurized fluid, directly and near-instantaneously increase a local pressure at the downstream region of the turbine and thereby reduce the pressure differential across the turbine;

providing a sensor configured to directly detect the shaft break event; and providing a control system connected to the sensor, wherein the control system is configured to activate the pressure equalization apparatus when the sensor of the pressure equalization apparatus directly detects the shaft break event.

10. The method as claimed in claim 9, further comprising:

providing a pressurized fluid supply in communication with the core airflow at the downstream region;

providing a regulating element configured to regulate introduction of the pressurized fluid from the supply into the core airflow at the downstream region;

inhibiting, using the regulating element, flow of the pressurized fluid from the supply into the core airflow at the downstream region before the shaft break event occurs; and permitting, using the regulating element, the flow of the pressurized fluid from the supply into the core airflow at the downstream region once the shaft break event occurs.

11. The method as claimed in claim 10, further comprising the steps of:

transmitting a signal from the sensor to the control system when the sensor directly detects the shaft break event; and activating the regulating element via the control system when the control system receives the signal transmitted by the sensor, wherein the activation of the regulating element permits the flow of pressurized fluid into the core airflow at the downstream region.

12. The method as claimed in claim 10, wherein the regulating element comprises a valve or pump.

13. The method as claimed in claim 10, wherein the pressurized fluid of the pressurized fluid supply is supplied from a compressor bleed, a combustor bleed, a bypass airflow, or a pressurized fluid storage tank.

14. The method as claimed in claim 9, wherein the sensor directly detects the shaft break event by measuring an axial movement, of at least a portion of the shaft or the turbine resulting from the shaft break event.

15. A gas turbine engine configured to carry out the method as claimed in claim 9.

* * * * *